US010701596B2

(12) United States Patent
Roeland et al.

(10) Patent No.: US 10,701,596 B2
(45) Date of Patent: Jun. 30, 2020

(54) ASSISTING RESOURCE ALLOCATION TRANSFER

(71) Applicant: Telefonaktiebolaget LM Ericsson (publ), Stockholm (SE)

(72) Inventors: Dinand Roeland, Sollentuna (SE); Zhang Fu, Stockholm (SE); András Zahemszky, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 32 days.

(21) Appl. No.: 16/083,371

(22) PCT Filed: Mar. 9, 2016

(86) PCT No.: PCT/EP2016/055032
§ 371 (c)(1),
(2) Date: Sep. 7, 2018

(87) PCT Pub. No.: WO2017/152971
PCT Pub. Date: Sep. 14, 2017

(65) Prior Publication Data
US 2019/0104444 A1 Apr. 4, 2019

(51) Int. Cl.
*H04W 36/00* (2009.01)
*H04L 12/801* (2013.01)
(Continued)

(52) U.S. Cl.
CPC ....... *H04W 36/0033* (2013.01); *H04L 47/193* (2013.01); *H04L 61/1511* (2013.01);
(Continued)

(58) Field of Classification Search
CPC ............ H04W 36/0033; H04L 47/193; H04L 61/1511; H04L 69/163
See application file for complete search history.

(56) References Cited

U.S. PATENT DOCUMENTS

2014/0185435 A1* 7/2014 Park .................. H04W 36/32
370/229
2014/0280470 A1* 9/2014 Calo .................. H04L 67/148
709/203
(Continued)

FOREIGN PATENT DOCUMENTS

| WO | 2010/019443 A2 | 2/2010 |
| WO | 2013/016842 A1 | 2/2013 |
| WO | 2014/182233 A2 | 11/2014 |

OTHER PUBLICATIONS

International Search Report and Written Opinion dated Nov. 8, 2016 issued in International Application No. PCT/EP2016/055032. (14 pages).
(Continued)

*Primary Examiner* — Gary Mui
(74) *Attorney, Agent, or Firm* — Sage Patent Group

(57) ABSTRACT

It is presented a method for assisting a resource allocation transfer of a wireless device from a source site of a mobile communication network to a target site of the mobile communication network. The method is performed in a service function node at the source site and comprises the steps of: receiving an indication of resource allocation transfer of the wireless device; and transmitting a reset signal to a user service node at the source site, the reset signal commanding the user service node to reset its transport layer session with the wireless device.

18 Claims, 5 Drawing Sheets

(51) Int. Cl.
   *H04L 29/12* (2006.01)
   *H04L 29/06* (2006.01)
   *H04W 24/08* (2009.01)
   *H04W 76/20* (2018.01)
   *H04W 92/20* (2009.01)

(52) U.S. Cl.
   CPC ........... *H04L 69/163* (2013.01); *H04W 24/08* (2013.01); *H04W 76/20* (2018.02); *H04W 92/20* (2013.01)

(56) References Cited

U.S. PATENT DOCUMENTS

| | | | |
|---|---|---|---|
| 2015/0189555 A1 | 7/2015 | Jagdeep | |
| 2015/0245264 A1* | 8/2015 | Xiong | H04L 67/2842 370/331 |
| 2016/0255539 A1* | 9/2016 | Mizukoshi | H04W 36/0072 370/329 |
| 2017/0244619 A1* | 8/2017 | Bhatia | H04L 43/08 |

OTHER PUBLICATIONS

3GPP TR 43.902 v13.0.0 (Dec. 2015), 3rd Generation Partnership Project; Technical Specification Group GSM/EDGE Radio Access Network; Enhanced Generic Access Networks (EGAN) study (Release 13), (Dec. 2015). (134 pages).

F. Gont et al., "On the Validation of TCP Sequence Numbers", TCP Maintenance and Minor Extensions; Internet-Draft, (Feb. 2013). (15 pages).

TCP Protocol, https://web.archive.org/web/20150221064838/http://linux.die.net:80/man/7/tcp (Feb. 22, 2015) (10 pages).

How Akamai Works, research.microsoft.com/en-us/um/people/ratul/alamai.html (Retrieved Mar. 15, 2016) (Last Modified: Sep. 3, 2001) (4 pages).

Communication pursuant to Article 94(3) EPC for European Application No. 16709042.2 dated Nov. 28, 2019—6 pages.

* cited by examiner

ASSISTING RESOURCE ALLOCATION TRANSFER

CROSS REFERENCE TO RELATED APPLICATION(S)

This application is a 35 U.S.C. § 371 National Stage of International Patent Application No. PCT/EP2016/055032, filed Mar. 9, 2016, designating the United States.

TECHNICAL FIELD

The invention relates to methods and service function nodes for assisting a resource allocation transfer of a wireless device from a source site of a mobile communication network to a target site, e.g. in connection with a handover.

BACKGROUND

Currently a number of activities are ongoing to define requirements on the next generation mobile network. One effort is a 5G (Fifth Generation) White Paper by the Next Generation Mobile Networks (NGMN) Alliance. The white paper lists a diverse set of use cases, including IoT (Internet of Things), vehicle-to-vehicle communications, controlling industrial robots, high quality media delivery, etc. These use cases define the requirements for the next generation of mobile networks, where flexibility is one of the key requirements. For each use case, user plane packets should traverse a different sequence of network service functions. A 5G core network architecture should offer an infrastructure to support flexibility of organizing such service chains.

When handover occurs in such an environment, it is of great importance that this does not imply complications and sub-optimal resource usage for user services which are active during the handover.

SUMMARY

It is an object of embodiments presented herein to support movement of allocated resources for a wireless device as it moves in the mobile communication network.

According to a first aspect, it is presented a method for assisting a resource allocation transfer of a wireless device from a source site of a mobile communication network to a target site of the communication mobile network. The method is performed in a service function node at the source site and comprises the steps of: receiving an indication of resource allocation transfer of the wireless device; and transmitting a reset signal to a user service node at the source site, the reset signal commanding the user service node to reset its transport layer session with the wireless device.

The method may further comprise the steps of: monitoring uplink or downlink packets between the wireless device and the user service node; and storing a session parameter of at least one uplink or downlink packet. In such a case, in the step of transmitting a reset signal to a user service node at the source site, the reset signal is associated with the session parameter. Optionally, the monitoring step comprises monitoring both uplink and downlink packets.

In the step of receiving an indication, the indication may be a request to move context data from the service function node at the source site to a corresponding service function node at the target site. In such a case, the method further comprises the step of transmitting connection information of a transport layer session at the service function node at the source site to the corresponding service function node at the target site. In such a case, in the step of transmitting connection information, the connection information comprises the session parameter.

The step of storing may further comprise storing at least one tag of at least one uplink packet or downlink packet, wherein each one of the at least one tag is meta-information about the packet; in which case, in the step of transmitting connection information, the connection information comprises the at least one tag.

The method may further comprise the step of: transmitting a move context response to a corresponding service function node at the target site In the transmitting a move context response step, the move context response may comprise context data of the service function node at the source site.

In the step of transmitting a reset signal, the reset signal may command the user service node to reset a Transmission Control Protocol, TCP, session.

In the step of transmitting a reset signal, the user service node may comprise a cache of a content delivery network.

According to a second aspect, it is presented a service function node for assisting a resource allocation transfer of a wireless device from a source site of a mobile communication network to a target site of the mobile communication network. The service function node comprises: a processor; and a memory storing instructions that, when executed by the processor, causes the service function node to: receive an indication of resource allocation transfer of the wireless device; and transmit a reset signal to a user service node at the source site, the reset signal commanding the user service node to reset its transport layer session with the wireless device.

The service function node may further comprise instructions that, when executed by the processor, causes the service function node to: monitor uplink or downlink packets between the wireless device and the user service node; and store a session parameter of at least one uplink or downlink packet. In such a case, in the step of transmitting a reset signal to a user service node at the source site, the reset signal is associated with the session parameter. Optionally, the instructions to monitor comprise instructions to monitor both uplink and downlink packets.

The service function node may further comprise instructions that, when executed by the processor, causes the service function node to: receive a request to move context data from the service function node at the source site to a corresponding service function node at the target site; and transmit connection information of a transport layer session at the service function node at the source site to the corresponding service function node at the target site. In such a case, the connection information comprises the session parameter.

The instructions to store may comprise instructions that, when executed by the processor, causes the service function node to store at least one tag of the last uplink or downlink packet, wherein each one of the at least one tag is used for routing the uplink or downlink packet to a respective service function; and wherein the connection information comprises the at least one tag.

The service function node may further comprise instructions that, when executed by the processor, causes the service function node to transmit a move context response to a corresponding service function node at the target site.

The reset signal may command the user service node to reset a Transmission Control Protocol, TCP, session.

The user service node may comprise a cache of a content delivery network.

The move context response may comprise context data of the service function node at the source site.

According to a third aspect, it is presented a service function node comprising: means for receiving, at the service function node being at the source site, an indication of resource allocation transfer of the wireless device from a source site of a mobile communication network to a target site of the mobile communication network; and means for transmitting a reset signal to a user service node at the source site, the reset signal commanding the user service node to reset its transport layer session with the wireless device.

According to a fourth aspect, it is presented a computer program for assisting a resource allocation transfer of a wireless device from a source site of a mobile communication network to a target site both of the mobile communication network. The computer program comprises computer program code which, when run on the service function node causes the service function node to: receive an indication of resource allocation transfer of the wireless device; and transmit a reset signal to a user service node at the source site, the reset signal commanding the user service node to reset its transport layer session with the wireless device.

According to a fifth aspect, it is presented a computer program product comprising a computer program according to the fourth aspect and a computer readable means on which the computer program is stored.

According to a sixth aspect, it is presented a method for assisting a resource allocation transfer of a wireless device from a source site of a mobile communication network to a target site of the mobile communication network. The method is performed in a service function node at the target site and comprising the steps of: receiving connection information of a transport layer session at a corresponding service function node at the source site, and transmitting a reset signal to the wireless device, the reset signal commanding the wireless device to reset its transport layer session associated with the connection information.

The method may further comprise the step of: transmitting a request to a corresponding service function node at the source site, the request commanding to move context data to the service function node at the target site from the corresponding service function node at the source site.

In the step of receiving connection information, the connection information may comprise a session parameter of at least one uplink or downlink packet monitored by the service function node at the source side.

In the step of receiving connection information, the connection information may comprise at least one tag of at least one uplink or downlink packet monitored by the service function node at the source side.

The method may further comprise the step of: receiving a move context response from the corresponding service function node at the target site.

According to a seventh aspect, it is presented a service function node for assisting a resource allocation transfer of a wireless device from a source site of a mobile communication network to a target site of the mobile communication network. The service function node is configured to be at the target site and comprising: a processor; and a memory storing instructions that, when executed by the processor, causes the service node to: receive connection information of a transport layer session at a corresponding service function node at the source site; and transmit a reset signal to the wireless device, the reset signal commanding the wireless device to reset its transport layer session associated with the connection information.

The service function node may further comprise instructions that, when executed by the processor, causes the service node to: transmit a request to a corresponding service function node at the source site, the request commanding to move context data to the service function node at the target site from the corresponding service function node at the source site.

The connection information may comprise a session parameter of at least one uplink or downlink packet monitored by the service function node at the source side.

The connection information may comprise at least one tag of at least one uplink or downlink packet monitored by the service function node at the source side.

The service function node may further comprise instructions that, when executed by the processor, causes the service node to: receive a move context response from the corresponding service function node at the target site.

According to an eighth aspect, it is presented a service function node comprising: means for receiving connection information of a transport layer session at a corresponding service function node at the source site; means for receiving a move context response from the corresponding service function node at the target site; and means for transmitting a reset signal to the wireless device, the reset signal commanding the wireless device to reset its transport layer session associated with the connection information.

According to a ninth aspect, it is presented a computer program for assisting a resource allocation transfer of a wireless device from a source site of a mobile communication network to a target site of the mobile communication network. The computer program comprises computer program code which, when run on a service node at the target site causes the service node to: receive connection information of a transport layer session at a corresponding service function node at the source site; receive a move context response from the corresponding service function node at the target site; and transmit a reset signal to the wireless device, the reset signal commanding the wireless device to reset its transport layer session associated with the connection information.

According to a tenth aspect, it is presented a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Any mention of "or" is to be interpreted as an open or, i.e. not an exclusive or, unless otherwise defined herein.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
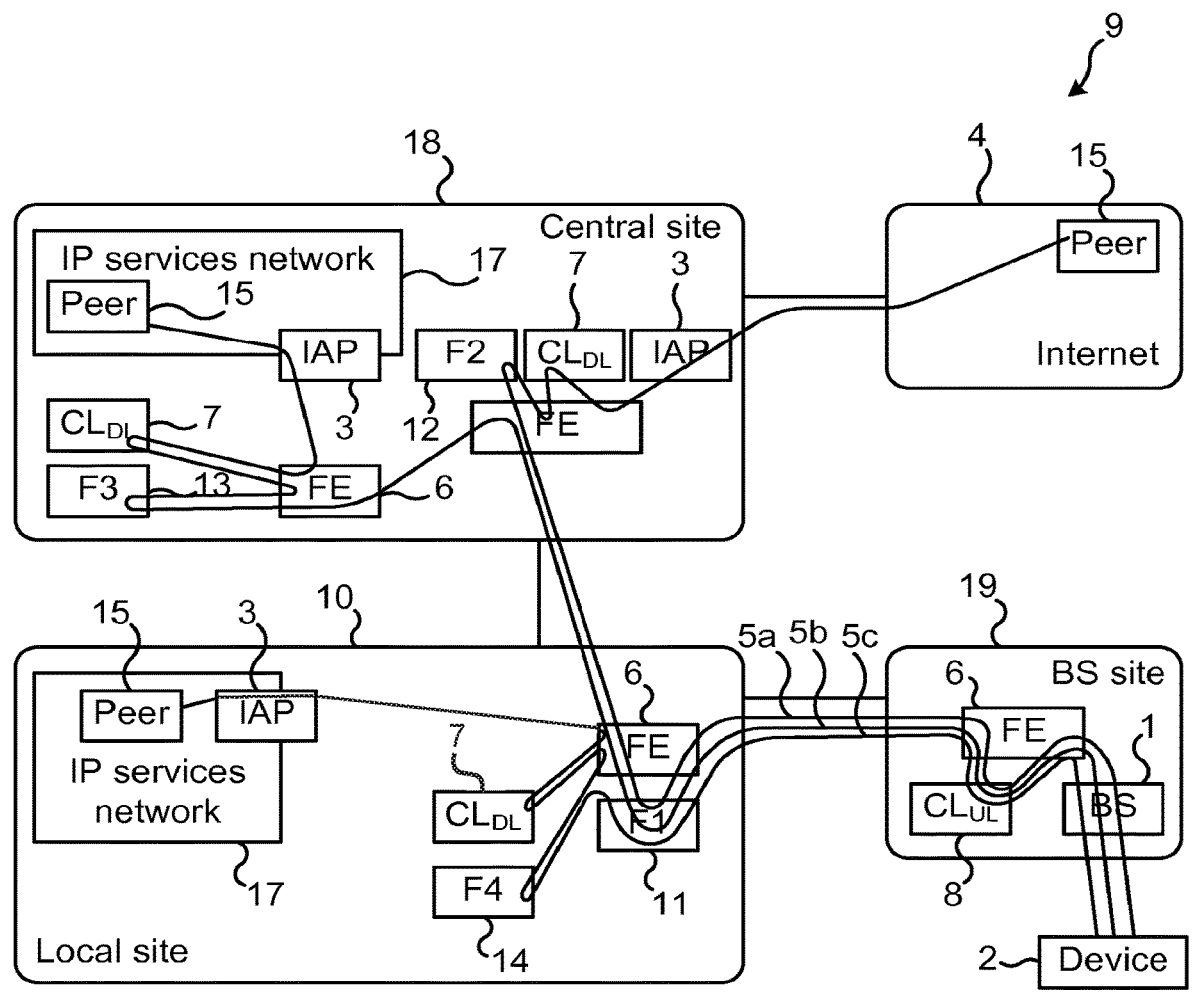
FIG. 1 is a schematic diagram illustrating an environment in which embodiments presented herein can be applied.

FIG. 1 is a schematic diagram illustrating an environment in which embodiments presented herein can be applied. A mobile communication network 9 is shown which can be applied for 5G. There is a central site 18, a local site 10 and a base station (BS) site 19. The central site 18 can be connected to the Internet 4. Respective user service nodes 15 are provided in each one of the Internet 4, the central site 18 and the local site 10. The user service nodes 15 correspond to each other. Each user service node 15 is thus a node providing a user service for a wireless device.

For instance, the user service nodes 15 can form part of a content delivery network, where the original source is the user service node 15 in the Internet, which is cached by the user service node 15 of the central site 18. Furthermore, the user service node 15 of the local site 10 can cache the content on a second level. This allows more efficient resource utilisation, particularly for large content such as video and audio.

The base station site 19 comprises a base station 1, a forwarding entity 6 and an uplink classifier. The base station 1 can be an evolved Node Bs, also known as eNode Bs or eNBs. The base station 1 could also be in the form of Node Bs, BTSs (Base Transceiver Stations) and/or BSSs (Base Station Subsystems), access point, etc. as long as the principles describe herein area applicable.

The base station 1 provides radio connectivity over a wireless interface to a plurality of wireless devices 2. The term wireless device 2 is also known as mobile communication terminal, user equipment (UE), mobile terminal, user terminal, user agent, wireless terminal, machine-to-machine device etc., and can be, for example, what today are commonly known as a mobile phone, smart phone or a tablet/laptop with wireless connectivity. The term wireless is here to be construed as having the ability to perform wireless communication. More specifically, the wireless terminal 2 can comprise a number of wires for internal and/or external purposes.

The mobile communication network 9 may e.g. comply with any suitable communication standard, e.g. any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Over the wireless interface, uplink (UL) communication occurs from the wireless device 2 to the network side and downlink (DL) communication occurs from the network towards the wireless device 2. The quality of the wireless radio interface to each wireless device 2 can vary over time and depending on the position of the wireless device 2, due to effects such as fading, multipath propagation, interference, etc.

It is to be noted that the mobile communication network 9 can comprise any suitable number of BS sites 19 and local sites 10.

A control plane (CP) (not shown) contains all control plane logic for controlling traffic in the network, allowing for a strict separation between control and user plane. The details of the control plane will not be described here as embodiments presented herein mainly concern the user plane.

The user plane contains three types of function nodes: Forwarding Element (FE) 6, service function nodes (SFN) 11-14 and Internet Protocol (IP) Advertisement Point (IAP) 3.

An FE 6 forwards each packet to one of its ports based on rules it has received from the CP. An FE 6 may forward a packet through one or more SFNs 11-14.

An FE 6 is only concerned with the actual forwarding; it does not classify or modify a packet.

An SFN is a service function that processes user plane packets, uplink and/or downlink. Processing may include altering the packet's payload and/or packet header. SFNs are not expected to know topological information regarding the chain, including which other SFNs are in the chain and how to reach them. An SFN may serve multiple users, and may or may not keep user-specific data. We call such user-specific data context herein. Context data is thus data relating to a user and/or a session with a particular wireless device (user). An SFN can be used for any suitable purpose, e.g. billing, priority handling, routing, etc. Hence, an SFN is a node implementing a service function, where the service function is a function which can be applied for uplink and/or downlink packets in the mobile communication network. The service function is triggered by a classifier adding a corresponding tag on the packet, instructing the FE where to route the packet.

The IAP 3 is a component used to achieve an anchorless network; i.e. a network without a mobility anchor point. An IAP 3 advertises a range of IP (Internet Protocol) addresses/prefixes towards an outer IP network, such as the Internet 4 or an operator-internal network. A single IP address/prefix may be advertised by multiple IAPs 3. If the IP address of a specific wireless device 2 is advertised by multiple IAPs 3, then packets for that wireless device 2 can enter the network via any of those IAPs 3. Similarly, an anchored approach can be achieved by allowing only a single IAP 3 to advertise the IP address for that wireless device 2. The CP contains a Location Registry (LR). This is a table of entries, where each entry is a mapping from the IP address/prefix of a wireless device 2 to a current location of the wireless device 2. The latter is e.g. encoded as a base station identifier (ID).

When a wireless device 2 moves from one BS to another, the CP ensures that the BS ID in the LR is updated with the new location. An IAP 3 is only used for downlink packets heading towards the wireless device 2. For each downlink packet, the IAP 3 performs a number of operations: 1) Query the LR based on the destination IP address of the packet in order to retrieve BS ID; 2) Tag the packet with BS ID; 3) Forward the packet via an FE 6 to the first SFN in the service chain as indicated in the LR reply. The concept of tagging is explained in more details below. Note that the LR can be implemented in an optimized fashion. E.g. the IAP 3 query may be performed towards an IAP-internal cache. Only if no entry is found in that cache, the LR is queried. For non-mobile devices, implementing the query is simplified as the entry in the LR for that wireless device 2 will not change.

Now the concept of service chaining will be explained. FEs 6 forward packets to different SFNs and BSs 1 according to which service chain the packets need to traverse and where the corresponding devices are located. Such information for routing the packet is added to the packet as tags by the classifiers.

A classifier (CL) is a SFN that determines which service chain a packet takes based on the packet header and rules it has received from the CP. A CL may change the packet's header, e.g. adding a tag to indicate which service chain the packet traverses. A tag is here to be interpreted as meta-information of the packet. A CL may contact the CP when a packet cannot be classified, or it may drop such packet. The classifier can be configured by the CP to apply any one or more of several triggering rules:

Before a wireless device 2 attaches. This can e.g. be generic rules that apply to multiple devices.

When a wireless device 2 attaches. This can be rules that apply to the specific user that attaches.

After the wireless device 2 has attached. These updates might originate from user specific real-time events that are reported to the CP from e.g. a SFN 14 performing Deep Packet Inspection (DPI), or an external application that requests the CP for a specific QoS (Quality of Service) processing.

There are both uplink classifiers $CL_{UL}$ 8 and downlink classifiers $CL_{DL}$ 7. There is at least one uplink classifier $CL_{UL}$ 8 and one downlink classifier $CL_{DL}$ 7 in the network 9 which classify the traffic from the devices and to the devices, respectively. Classifiers would typically be placed early in the chain; e.g. the $CL_{UL}$ 8 is at the base station site 19 and the $CL_{DL}$ 7 can be co-located with the IAP 3.

FEs 6 forward packets according to tags in the packets. Tags be can logically expressed with a name/value pair. A packet may have one or more tags. There are multiple ways to carry tags in packets. For instance, tags can be encoded as Virtual Local Area Networks (VLANs), or a tunnelling protocol where a variable number of tags can be carried as meta-information. In certain cases, an existing protocol element can act as tag value; e.g. an IP address can act as a wireless device ID. Regarding the implementation, the FEs 6 can be implemented as OpenFlow switches, given that OpenFlow is a communications protocol that gives access to the forwarding plane of a network switch or router over the network. OpenFlow supports multiple tags and also multiple flow tables. Alternatively, the FEs 6 and SFNs can be implemented as virtualized network entities running on general-purpose hardware.

An SFN handles a collection of flows. The definition of flows is kept flexible and can be configured by the CP depending on the use case. Examples of flows include: packets with the same IP 5-tuple, all packets to/from a specific BS. IP 5-tuple is a collection of session parameters being one way of defining a communication session. Specifically, the IP 5-tuple contains source IP address, source port, destination IP address, destination port, protocol (e.g. TCP (Transport Control Protocol), UDP (User Datagram Protocol), etc.). The protocol is optionally implicit (e.g. TCP), whereby only the four remaining session parameters are sufficient to define a communication session. Hence, the session is a link used for communication and can be defined by communication details as explained above.

An FE 6 may forward a packet through one or more SFNs 14. An FE 6 is only concerned with the actual forwarding; it does not classify or modify a packet.

Putting it all together, an uplink packet would traverse the BS 1 and one or more FEs 6. Each FE 6 may forward the packet via one or more SFNs (including the uplink classifier 8). Similarly, a downlink packet would traverse the IAP 3, one or more FEs 6 and a BS 1. In both uplink and downlink, at least one SFN acts as a classifier.

One important use case for many operators today is the mobile broadband offering. Given that a large portion of the mobile broadband traffic can typically be cached, Content Delivery Networks (CDNs) can be installed to reduce peering cost. In a typical EPC deployment, such CDNs would reside in a central site together with P-GWs (Packet Data Network Gateway) and other EPC components. However, in embodiments presented herein, the P-GW and S-GW of EPC are decomposed into multiple smaller SFNs. The CDN is then implemented in a number of user service nodes 15. In this example, there may be one chain of functions for traffic towards the CDNs and one chain for traffic towards Internet. Both chains may have segments in common. The functions may be spread out across the topology. A first chain 5a, being a chain to the user service node 15 on the Internet 4, involves the use of a first SFN 11 at the local site to and a second SFN 12 at the central site 18. For instance, the first SFN 11 could be a bandwidth limiter, and the second SFN 12 could be DPI (Deep Packet Inspection) function, or a complex charging function. A second chain 5b, being a chain to the user service node 15 at the central site 18, involves the use of the first SFN 11 and a third SFN 13, where the third SFN may perform simple charging.

In some use cases it may be beneficial to perform processing in user service nodes 15 in a local site to or base station site 19 instead of in a central site 18 which is far away from the wireless device 2. For instance, the CDN from the use case above may be placed in a local site to in order to save bandwidth between local and central site. Caching can then be effected in different levels with increasing latency, bandwidth requirements and content availability from the local site to to the central cite 18 to the Internet site 4. In another example, the base station site 19 may host a specific application that requires very low latency; e.g. an industry application when the wireless device 2 forms part of a factory robot. For such a case, a third chain 5c, being a chain to the user service node 15 at the local site to, involves the use of the first SFN 11 and a fourth SFN 14. The fourth SFN can be for application where low latency is beneficial, e.g. marking traffic with high priority. The fourth SFN is used during resource allocation transfer for the wireless device 2, as explained in more detail below.

It is to be noted that the chains 5a-c in FIG. 1 are simplified with regards to uplink and downlink symmetry. The chaining concept itself allows certain SFNs only to be traversed in one direction; e.g. the uplink classifier 8 only in the uplink.

Now a scenario for handover of the wireless device 2 will be described. In this example, there are two local sites to (A and B), each connected to a different base station site 19

(also A and B). So, BS-A is connected via local site A to a central site 18. BS-B is connected via local site B to the same central site.

The user service node 15 in local site A and the user service node 15 in local site B provide the same service; which would be the case in the mentioned CDN example. In such scenario, we want the device to connect to user service node A when attached via BS-A, and we want the device to connect to user service node B when attached via BS-B. In this way, we maintain optimal routing, thereby minimizing latency and network bandwidth consumption.

Looking first to an anycast scenario, the user service node 15 in local site A and user service node 15 in local site B share the same anycast address. The device has a TCP connection with the user service node 15 of the anycast address, which would be user service node 15 A when the device is connected to BS-A.

Now the device moves, and as a result there is a handover from BS-A to BS-B (as known in the art per se). As part of the handover procedure, the first SFN and the fourth SFN instances are sourced from site B (see below).

After handover, the packets from wireless device to the anycast IP address will be served by the functions in local site B. Therefore, due to the chaining and the anycast routing mechanism, TCP packets from the wireless device to user service node 15 B in local site B, the wireless device cannot communicate with user service node 15 A anymore.

In the prior art, the following will now happen:
After receiving a packet from the wireless device, user service node B doesn't recognize the TCP connection. It will send a TCP RST (reset) packet to the wireless device.
The wireless device receives the TCP RST and closes the connection.
The wireless device re-establishes the TCP connection. This re-establishment now goes to user service node 15 B. After this, a new connection between wireless device and user service node 15 B has been established.

However, during this connection re-establishment and even after that, user service node A may continue to send data to the wireless device. The user service node A may also re-send packet because there are no acknowledgements coming from the wireless device 2. Given the anchorless concept, such packets will end up at the wireless device 2. Most likely, the wireless device 2 will just ignore these packets from the old connection, because the wireless device is anyway resetting that old connection.

However, it might happen that the wireless device 2 binds the new connection to the port of the old connection. Therefore if the packets from user service node A arrive at the client, the packet sequence numbers fall out of the window of the current TCP session. These packets will be dropped and either an ACK, an RST (then the current TCP session is subverted) or no response is generated. User service node A is not aware that the wireless device 2 has moved. It will just continue to send packets without getting any acknowledgement. E.g., in Linux, the default number of retransmission times is 15. If the user service node does not receive acknowledgements from the wireless device, it will retransmit the packets 15 times. In total this takes approximately between 13 to 30 minutes, depending on the retransmission timeout. This wastes resources both in user service node A and in the network.

Looking now to a unicast scenario according to prior art, the user service nodes have a plain unicast IP address. If the same handover as described before occurs, the wireless device will continue to address the original user service node, i.e. user service node A. Depending on the configuration of the uplink classifier 8 in base station site B, the uplink classifier may:
Not recognize the address of user service node A, and discard the packet.
Recognize the address of user service node A as a local service, and mark the packet for a chain back to local site A.
Recognize the address of user service node A as some other service, and mark the packet on a central routing chain.

In the first and third case, the packet gets lost and discarded. The result is that the wireless device will not receive any acknowledgements. It will eventually time-out and close the connection. The time-out may take a while (60 seconds by default, but up to several minutes), which will not improve the perceived quality of experience for the user of the device.

In the second case, the packet reaches the old user service node A. This causes non-optimal routing which we want to avoid.

Embodiments of the present invention provide solutions to these problems with resource allocation transfer and will now be described with reference to FIGS. 2 and 3. Resource allocation transfer is a process where the responsibility of serving a wireless device is moved from a source network node to a target network node. Source site here relates to an installation site associated with the source network node, e.g. of a handover process. Target site here relates to an installation site associated with the target network node, e.g. of a handover process.

Figure 2:
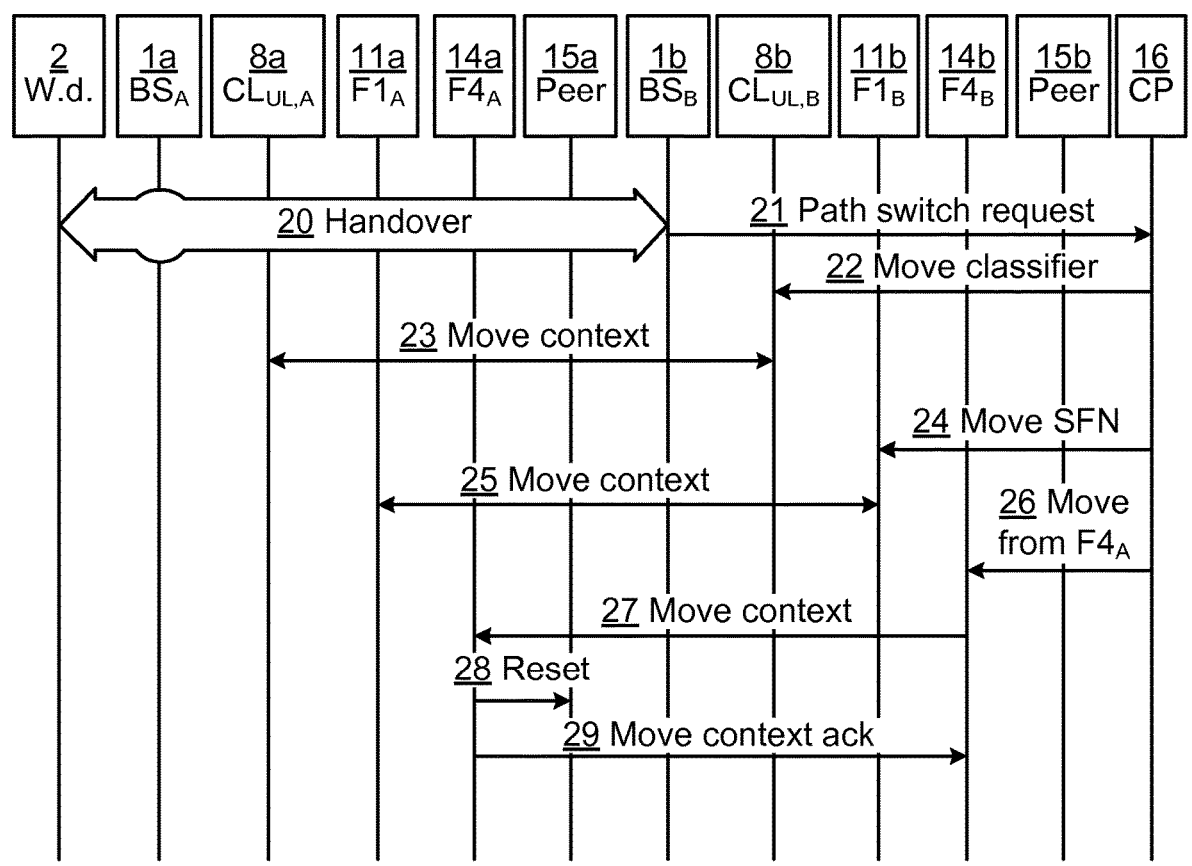
FIGS. 2 and 3 are sequence diagrams illustrating communication between various entities of embodiments which can be applied in the environment of FIG. 1.
Figure 3:
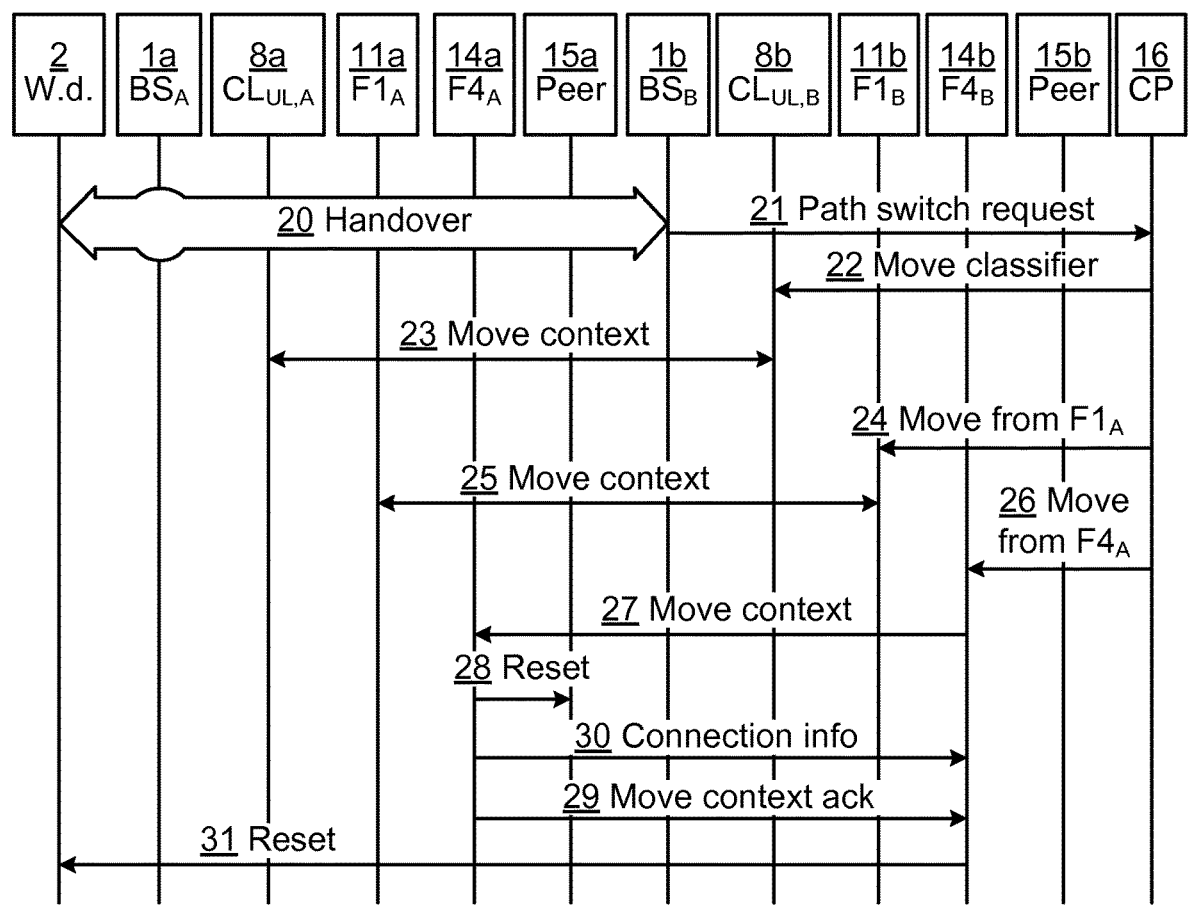

FIGS. 2 and 3 are sequence diagrams illustrating communication between various entities of embodiments which can be applied in the environment of FIG. 1. FIG. 2 will now be described, also with reference to FIG. 1. In FIG. 2, the entities with a reference numeral with a suffix 'a' are located in association with, or at, a source site of a handover. The entities with a reference numeral with a suffix 'b' are located in association with, or at, a target site of a handover. A local site 10 is considered to be associated with a BS site 19, respectively for the source site and the target site. The embodiments presented herein are based on letting the network reset connections upon mobility. This forces the user service node of the source to drop the connection, and forces the wireless device to re-establish a new connection using the source site resources, since the new connection would be routed to the current closest user service node.

A wireless device 2 is involved in a handover 20 from a source base station 1a to a target base station 1b. The target base station 1b sends a path switch request 21 to the control plane 16. The control plane 16 will then send messages to the SFNs to move context.

First, the control plane 16 transmits a move classifier request 22 to the target uplink classifier 8b. This triggers the target uplink classifier 8b to move context 23 from the source uplink classifier 8a to the target uplink classifier 8b.

Secondly, the control plane 16 transmits a move SFN request 24 to the first target SFN 11b. This triggers the first target SFN 11b to move context 25 from the first source SFN 11a to the first target SFN 11b.

Thirdly, the control plane 16 transmits a move SFN request 26 to the fourth target SFN 14d. This triggers the fourth target SFN 14b to send a move context request 27 from the fourth target SFN 14b to the fourth source SFN 14a.

However, the fourth source SFN 14a here sends a reset signal 28 to the source user service node 15a. The reset signal 28 commands the source user service node 15a to reset its transport layer session (such as a TCP session) with the wireless device. This prevents the source user service node 15a from trying to send data to the wireless device 2 after handover, thus reducing unnecessary network and processing power usage, alleviating the problems described above.

As source address, the fourth target SFN 14b uses the IP address of the wireless device 2. The fourth target SFN 14b re-uses the tags used in uplink packets (e.g. the last packet) from wireless device 2 to the source user service node 15a. Note that this means that the fourth source SFN 14a monitors uplink packets in order to capture the wireless device IP address and the tags used.

The chain between the fourth source target SFN 14a and the source user service node 15a is still intact when the move context request 27 is received. In this way, it is still possible for the fourth source target SFN 14a to send a packet to the source user service node 15a (i.e. the reset signal 28). In other words the fragment between the fourth target SFN 14a and the source user service node 15a should be intact.

Once the reset is done, the fourth source SFN 14a transmits a move context to acknowledgement 29 to the fourth target SFN 14b.

Looking now to FIG. 3, after the reset 28 is sent, the fourth source SFN 14a transmits its connection info 30 to the fourth target SFN 14a. In this way, the fourth target SFN 14b can also send a reset 31 to the wireless device 2 for the connection that the wireless device 2 had with the fourth source SFN 14a, reducing or eliminating any attempts (including retransmissions, etc.) by the wireless device 2 to the fourth source SFN 14a. This leads to a faster connection re-establishment after handover.

Note that when sending the reset 31 to the wireless device 2, the fourth target SFN 14b can use the tags it has received from the fourth source SFN 14a, similar as described in the solution in the previous section. But it may also need to use a new location ID. This would come from the CP 16; e.g. in the move from F4$_A$ request 26 (and signals 27 and 30). Alternatively, the fourth target SFN 14b performs its own location query (not shown). In either way, the fourth target SFN 14b would then change the tags in the packet.

This can be avoided if the fourth target SFN 14b sends the packet instead to the downlink classifier 7. If the fourth target SFN 14b does not know the address of the downlink classifier 7, which is likely, then the fourth target SFN 14b may even send a packet to the IAP 3.

Note that, in the anycast scenario, the wireless device 2 establishes the new connection using the same anycast IP address. In the unicast scenario, the IP address of the target user service node 15b is different from the IP address of the source user service node 15a. The IP addresses can be obtained e.g. using DNS (Domain Name Service). When the connection gets reset, the wireless device 2 refreshes the address to use for the user service node (e.g. be re-sending a DNS query). In case of a DNS solution, note that the wireless device 2 usually has its own DNS cache. To make sure the corresponding DNS record is refreshed in time, the TTL (time to live) of the record should be low, e.g. TTL=0. However, the TTL of the DNS records are usually not zero, Then it could happen that, when the wireless device 2 tries to re-establish the connection after the reset by the service function, it uses the IP address of the old edge cache due to the corresponding DNS entry is not expired in its local DNS cache. One solution for that is the service function sees the DNS packets to the UE and knows the TTL of the DNS record; then after a handover, the service function waits the DNS record to be expired and resets the TCP connection. Fortunately, the waiting time can be very small (smaller than the TTL), since the TTL values are already small for most of the CDN networks, e.g. the CDN supplier Akamai sets the DNS records for its cache to 20 seconds.

Figure 4A:
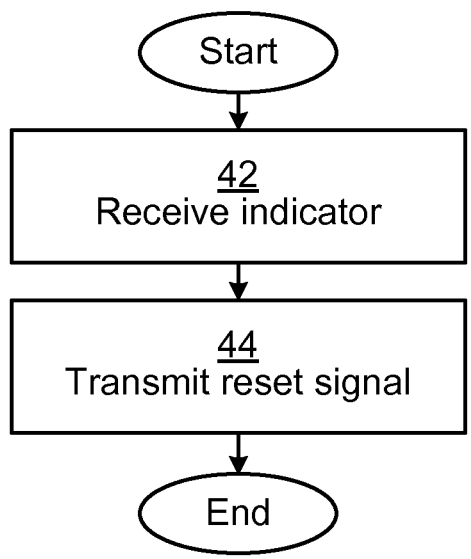
FIGS. 4A-B are flow charts illustrating methods for assisting resource allocation transfer performed in service function node at the source site.
Figure 4B:
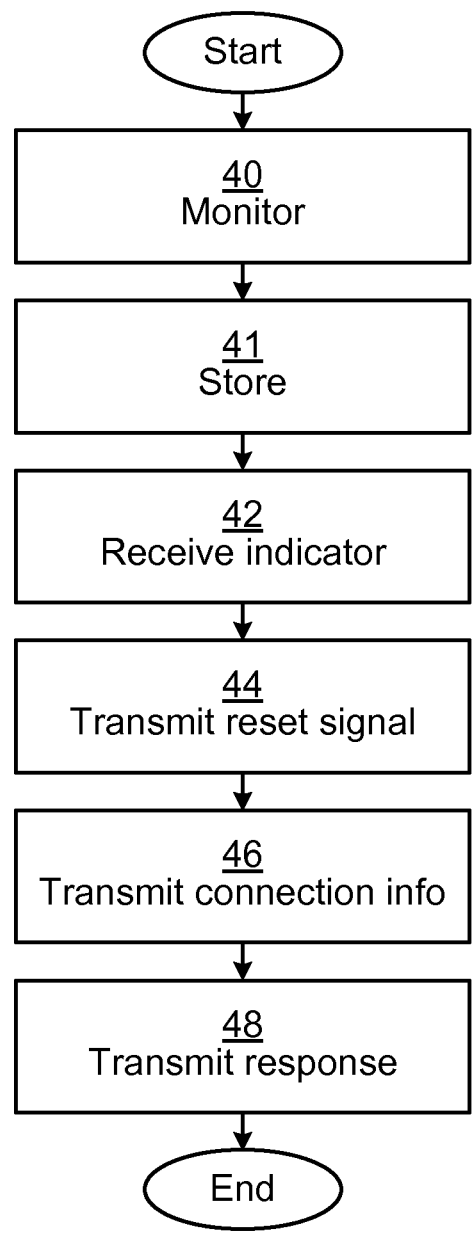

In the embodiment illustrated in FIG. 3, the reset to the source user service node 15a may optionally be skipped FIGS. 4A-B are flow charts illustrating methods for assisting resource allocation transfer performed in a SFN at the source site. The methods are performed to assist a resource allocation transfer of a wireless device from a source site of a mobile communication network to a target site. Both the source site and the target site are part of the mobile communication network. The methods are performed in a SFN at the source site.

Looking first to FIG. 4A, in a receive indication step 42, an indication of resource allocation transfer of the wireless device is received. The indication can e.g. be a request to move context data (e.g. signal 27) from the SFN at the source site to a corresponding SFN at the target site.

In a transmit reset signal step 44, a reset signal (e.g. signal 28) is transmitted to a user service node at the source site. The reset signal commands the user service node to reset its transport layer session with the wireless device. When TCP is used, the reset signal commands the user service node to reset its TCP session.

In one embodiment, the user service node comprises a cache of a content delivery network. However, other functions of the user service node are equally possible, especially when the user service node is provided in the local site.

Looking now to FIG. 4B, only new or modified steps compared to the method described with reference to FIG. 4A will be described.

In an optional monitor step 40, uplink packets from the wireless device to the user service node are monitored. Alternatively or additionally, downlink packets to the wireless device are also monitored.

In an optional store step 41, a session parameter of at least one uplink and/or downlink packet (from the monitor step 40) is stored. In one embodiment, the session parameter is of the last uplink packet of step 40. Optionally, this comprises storing at least one tag of the last uplink and/or downlink packet (from the monitor step 40). As explained above, each one of the at least one tag is meta-information about the packet. The meta-information (e.g. tags and IP address of the wireless device) from the monitored packet(s) can e.g. be used in the reset signal in step 44. In other words, the reset signal is associated with the session parameter.

In an optional transmit connection info step 46, connection information (e.g. signal 30) is transmitted to the corresponding SFN at the target site. The connection information relates to a transport layer session at the SFN at the source site.

When step 41 is performed, the connection information may comprise the session information and/or at least one tag.

In an optional transmit response step 48, a move context response (e.g. signal 29) is transmitted to a corresponding SFN at the target site. This context response can comprise context data of the SFN at the source site.

Figure 5A:
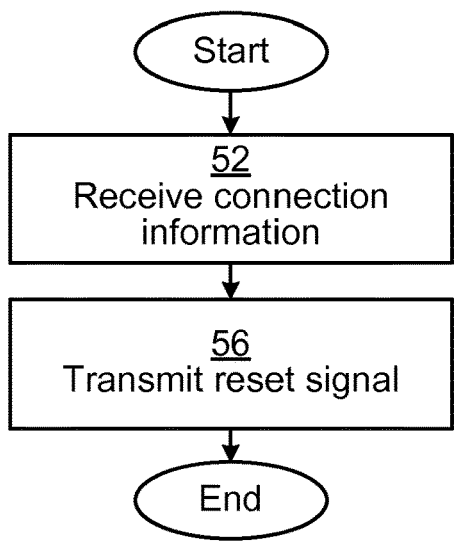
FIGS. 5A-B are flow charts illustrating methods for assisting resource allocation transfer performed in service function node at the target site.
Figure 5B:
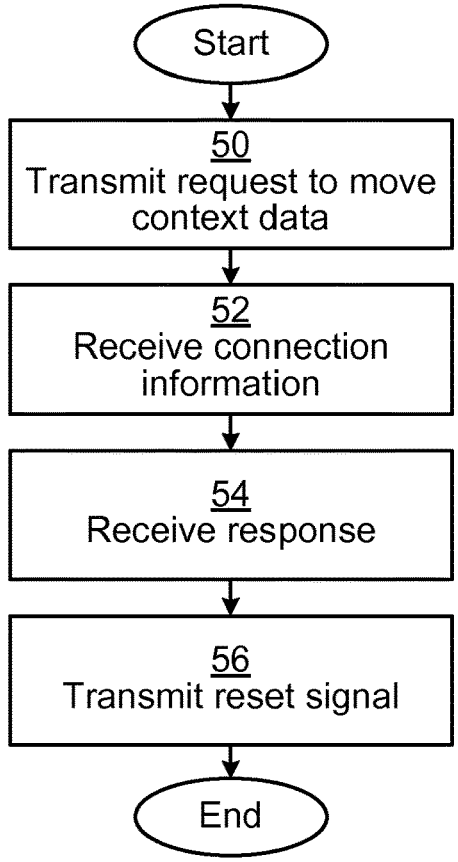

FIGS. 5A-B are flow charts illustrating methods for assisting resource allocation transfer performed in service function node at the target site.

In a receive connection information step 52, connection information is received. The connection information relates to a transport layer session at the service function node at the source site. This connection information corresponds to signal 30.

Optionally, the connection information comprises a session parameter of at least one uplink and/or at least one downlink packet monitored by the service function node at the source side. Optionally, the connection information comprises at least one tag of at least one uplink and/or downlink packet monitored by the service function node at the source side.

In a transmit reset signal step 56, a reset signal is transmitted to the wireless device. The reset signal commands the wireless device to reset its transport layer session associated with the connection information. This reset signal corresponds to signal 31.

Looking now to FIG. 5B, only new or modified steps will be described.

In an optional transmit request to move context data step 50, a request is transmitted to a corresponding service function node at the source site. The request commands the service function node at the source site to move context data to the service function node at the target site from the corresponding service function node at the source site. This request corresponds to signal 27.

In an optional receive response step 54, a move context response is received from the corresponding service function node at the target site. The move context response corresponds to signal 29.

Figure 6:
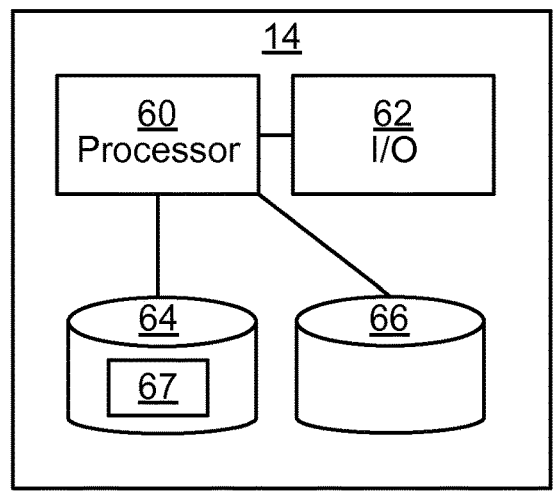
FIG. 6 is a schematic diagram illustrating components of any one of the service function nodes of FIG. 1, here represented by a single service function node.

FIG. 6 is a schematic diagram illustrating components of any one of the SFN s 14, 14a, 14b of FIG. 1, FIG. 2 and FIG. 3, here represented by a single SFN.

A processor 60 is provided using any combination of one or more of a suitable central processing unit (CPU), multi-processor, microcontroller, digital signal processor (DSP), application specific integrated circuit etc., capable of executing software instructions 67 stored in a memory 64, which can thus be a computer program product. The processor 60 can be configured to execute the methods described with reference to FIGS. 4A-B and FIG. 5 above. The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 66 is also provided for reading and/or storing data during execution of software instructions in the processor 60. The data memory 66 can be any combination of read and write memory (RAM) and read only memory (ROM).

The SFN 14 further comprises an I/O interface 62 for communicating with other external entities. Optionally, the I/O interface 62 also includes a user interface.

Other components of the SFN 14 are omitted in order not to obscure the concepts presented herein.

Figure 7:
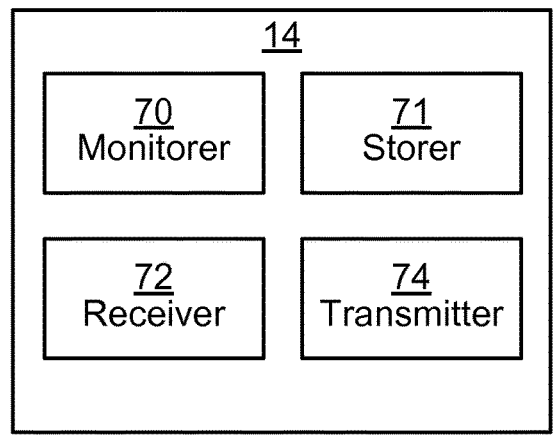
FIG. 7 is a schematic diagram showing functional modules of any one of the service function nodes of FIG. 1 here represented by a single service function node.

FIG. 7 is a schematic diagram showing functional modules of any one of the SFN s 14, 14a, 14b of FIG. 1, FIG. 2 and FIG. 3, here represented by a single SFN. The modules are implemented using software instructions such as a computer program executing in the SFN 14. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 6A and 6B.

A monitorer 70 corresponds to step 40. A storer 71 corresponds to step 41. A receiver corresponds to steps 42, 52 and 54. A transmitter 74 corresponds to steps 44, 46, 48, 50 and 56.

Figure 8:
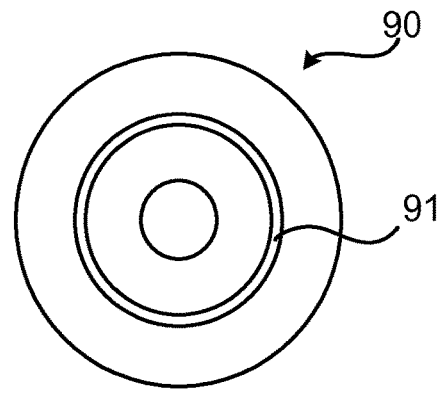
FIG. 8 shows one example of a computer program product comprising computer readable means.

FIG. 8 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for assisting a resource allocation transfer of a wireless device from a source site of a mobile communication network to a target site of the mobile communication network, the method being performed in a service function node at the source site and comprising the steps of:
   receiving, from a service function node at the target site, an indication of resource allocation transfer of the wireless device;
   transmitting a reset signal to a user service node at the source site, the reset signal commanding the user service node to reset its transport layer session with the wireless device; and
   transmitting connection information of the transport layer session at the service function node at the source site to the corresponding service function node at the target site, the connection information comprises a session parameter.

2. The method of claim 1, further comprising the steps of:
   monitoring uplink or downlink packets between the wireless device and the user service node; and
   storing the session parameter of at least one uplink or downlink packet;
   wherein in the step of transmitting a reset signal to a user service node at the source site, the reset signal is associated with the session parameter.

3. The method of claim 2, wherein the step of storing further comprises storing at least one tag of at least one uplink or downlink packet, wherein each one of the at least one tag is meta-information about the packet; and
   wherein in the step of transmitting connection information, the connection information comprises the at least one tag.

4. The method of claim 1, wherein in the step of receiving an indication, the indication is a request to move context data from the service function node at the source site to a corresponding service function node at the target site.

5. The method of claim 1, further comprising the step of:
   transmitting a move context response to a corresponding service function node at the target site, wherein the move context response comprises context data of the service function node at the source site.

6. The method of claim 1, wherein in the step of transmitting a reset signal, the reset signal commands the user service node to reset a Transmission Control Protocol, TCP, session.

7. A service function node for assisting a resource allocation transfer of a wireless device from a source site of a mobile communication network to a target site of the mobile communication network, the service function node comprising:
- a processor; and
- a memory storing instructions that, when executed by the processor, causes the service function node to:
- receive, from a service function node at the target site, an indication of resource allocation transfer of the wireless device;
- transmit a reset signal to a user service node at the source site, the reset signal commanding the user service node to reset its transport layer session with the wireless device; and
- transmit connection information of the transport layer session at the service function node at the source site to the corresponding service function node at the target site, the connection information comprises the session parameter.

8. The service function node of claim 7, further comprising instructions that, when executed by the processor, causes the service function node to:
- monitor uplink or downlink packets from between the wireless device and the user service node; and
- store the session parameter of at least one uplink or downlink packet;
- wherein in the step of transmitting a reset signal to a user service node at the source site, the reset signal is associated with the session parameter.

9. The service function node of claim 8, wherein the instructions to store comprise instructions that, when executed by the processor, causes the service function node to store at least one tag of the last uplink or downlink packet, wherein each one of the at least one tag is used for routing the uplink or downlink packet to a respective service function; and wherein the connection information comprises the at least one tag.

10. The service function node of claim 7, further comprising instructions that, when executed by the processor, causes the service function node to:
- receive a request to move context data from the service function node at the source site to a corresponding service function node at the target site.

11. The service function node of claim 7, further comprising instructions that, when executed by the processor, causes the service function node to transmit a move context response to a corresponding service function node at the target site.

12. The service function node of claim 7, wherein the reset signal commands the user service node to reset a Transmission Control Protocol, TCP, session.

13. A method for assisting a resource allocation transfer of a wireless device from a source site of a mobile communication network to a target site of the mobile communication network, the method being performed in a service function node at the target site and comprising the steps of:
- receiving connection information of a transport layer session from a corresponding service function node at the source site, and
- transmitting a reset signal to the wireless device, the reset signal commanding the wireless device to reset its transport layer session associated with the connection information,
- wherein the connection information comprises a session parameter of at least one uplink or downlink packet monitored by the service function node at the source side.

14. The method of claim 13, further comprising the step of:
- transmitting a request to a corresponding service function node at the source site, the request commanding to move context data to the service function node at the target site from the corresponding service function node at the source site.

15. A service function node for assisting a resource allocation transfer of a wireless device from a source site of a mobile communication network to a target site of the mobile communication network, the service function node being configured to be at the target site and comprising:
- a processor; and
- a memory storing instructions that, when executed by the processor, causes the service node to:
- receive connection information of a transport layer session from a corresponding service function node at the source site; and
- transmit a reset signal to the wireless device, the reset signal commanding the wireless device to reset its transport layer session associated with the connection information,
- wherein the connection information comprises a session parameter of at least one uplink or downlink packet monitored by the service function node at the source side.

16. The service function node of claim 15, further comprising instructions that, when executed by the processor, causes the service node to:
- transmit a request to a corresponding service function node at the source site, the request commanding to move context data to the service function node at the target site from the corresponding service function node at the source site.

17. A computer program product comprising a non-transitory computer readable medium storing a computer program comprising computer program code which, when run on the service function node causes the service function node to perform the method of claim 1.

18. A computer program product comprising a non-transitory computer readable medium storing a computer program comprising computer program code which, when run on a service node at the target site causes the service node to perform the method of claim 13.

* * * * *